(12) United States Patent
Hamke

(10) Patent No.: US 7,008,111 B2
(45) Date of Patent: Mar. 7, 2006

(54) FLUIDICS-BALANCED FLUID BEARING

(75) Inventor: Rolf E. Hamke, Folsom, CA (US)

(73) Assignee: Aerojet-General Corporation, Sacramento, CA (US)

( * ) Notice: Subject to any disclaimer, the term of this patent is extended or adjusted under 35 U.S.C. 154(b) by 123 days.

(21) Appl. No.: 10/729,866

(22) Filed: Dec. 5, 2003

(65) Prior Publication Data

US 2004/0247211 A1    Dec. 9, 2004

Related U.S. Application Data

(60) Provisional application No. 60/434,048, filed on Dec. 16, 2002.

(51) Int. Cl.
    *F16C 32/06* (2006.01)
(52) U.S. Cl. .................................... 384/107
(58) Field of Classification Search ............... 384/100, 384/107
    See application file for complete search history.

(56) References Cited

U.S. PATENT DOCUMENTS

| | | | |
|---|---|---|---|
| 3,271,086 A * | 9/1966 | Deffrenne | ............... 384/100 |
| 3,555,666 A | 1/1971 | Rhee | |
| 4,381,002 A | 4/1983 | Mon | |
| 4,852,613 A | 8/1989 | Tippetts et al. | |
| 4,865,529 A | 9/1989 | Sutton et al. | |
| 5,017,023 A | 5/1991 | Scharrer et al. | |
| 5,064,297 A * | 11/1991 | Tanaka et al. | ............... 384/100 |
| 5,073,038 A | 12/1991 | Sutton et al. | |
| 5,209,652 A | 5/1993 | Fischer et al. | |
| 5,238,308 A | 8/1993 | Lang et al. | |
| 5,281,032 A * | 1/1994 | Slocum | ............... 384/118 |
| 5,348,401 A | 9/1994 | Justak et al. | |
| 5,356,225 A * | 10/1994 | Hanes et al. | ............... 384/100 |
| 5,360,273 A | 11/1994 | Buckmann | |
| 5,364,190 A * | 11/1994 | Ochiai et al. | ............... 384/100 |
| 5,449,235 A | 9/1995 | Buckmann | |
| 5,509,517 A | 4/1996 | Berenson et al. | |
| 5,519,274 A | 5/1996 | Scharrer | |
| 5,529,464 A | 6/1996 | Emerson et al. | |
| 5,697,767 A | 12/1997 | Bissell et al. | |
| 5,885,004 A | 3/1999 | Scharrer et al. | |
| 5,924,634 A | 7/1999 | Arndt et al. | |
| 6,056,441 A | 5/2000 | Scharrer et al. | |
| 6,393,830 B1 | 5/2002 | Hamke et al. | |
| 6,518,770 B1 | 2/2003 | Childs | |
| 6,547,438 B1 * | 4/2003 | Shima | ............... 384/100 |
| 6,630,012 B1 | 10/2003 | Wegeng et al. | |

* cited by examiner

*Primary Examiner*—Thomas R. Hannon
(74) *Attorney, Agent, or Firm*—M. Henry Heines; Townsend and Townsend and Crew, LLP (57) ABSTRACT

Radial loads and vibrations and axial loads on a rotor are balanced by a fluid bearing controlled by a self-regulating system that supplies fluid flow or pressure to the gap between the rotor and stator in response to signals of imbalance generated in the machinery itself. The resulting balancing force is thus created by fluidics, and in certain embodiments the sensing circuit is fluidics-based as well. This system provides enhanced flexibility and response time relative to conventional fluid bearings.

10 Claims, 6 Drawing Sheets

FLUIDICS-BALANCED FLUID BEARING

CROSS REFERENCE TO RELATED APPLICATION

This application is related to U.S. Provisional Patent Application No. 60/434,048, filed Dec. 16, 2002, and claims all benefits legally capable of being offered by the provisional patent application. The entire contents of the provisional patent application are incorporated herein by reference.

BACKGROUND OF THE INVENTION

1. Field of the Invention

This invention resides in the field of bearings for high-speed rotary machinery, and fluid bearings in particular.

2. Description of the Prior Art

Bearings are a critical part of any rotary machinery, particularly when such machinery is operated at high speed and high pressure. Many types of machinery are designed for operation under these conditions, ranging from industrial rotary equipment to aircraft, including turbopumps and propulsion and injection systems. The average consumer may be most familiar with rolling element bearings, but these are unsuitable for high-speed and high-pressure machinery due to the speed and load capacity limitations of a typical rolling element bearing and the wear that such a bearing suffers during extended use. The bearings that are used are therefore fluid bearings, both hydrodynamic and hydrostatic.

Hydrodynamic bearings rely on the dynamic effect of the rotor on the fluid. In rotary systems containing hydrodynamic bearings, the motion of the rotor itself draws the bearing fluid into the regions where the gap between the rotor and stator is the smallest and the friction therefore the greatest, and by drawing the fluid into these regions the bearing increases the pressure in these regions. Hydrostatic bearings supply fluid from an external pressurized source to designated regions of the gap, although these bearings often include withdrawal and recycling of the fluid as needed to adjust the pressure differentials and the position of the rotor. Unlike hydrodynamic bearings, the pressure exerted by a hydrostatic bearing is not dependent on the rotation of the rotor.

One of the factors in achieving and maintaining a long life cycle for high-speed rotary machinery is the balancing of the forces on the rotor. Transient loads present a special challenge to the design of the bearing, since balancing these loads requires a high degree of flexibility and rapid response time. Rotary machinery of the prior art typically lacks this flexibility.

SUMMARY OF THE INVENTION

It has now been discovered that the forces on the rotor in high-speed rotary machinery can be balanced with a fast response time and high flexibility by a fluid bearing that supplies fluid flow or pressure to selected sites in the gap between the rotor and the stator as a fluidic response to load signals generated by the machinery itself. This self-balancing bearing is capable of use as either a hydrodynamic and hydrostatic bearing and offers the fast response times (approximately 0.005 msec or less) that are typical of fluidics devices in general. The balancing forces generated in accordance with this invention can be used for balancing a thrust load on the rotor, a radial load, or both. The fluidics force transmission is achieved by one or more channels joining the gap with a source of pressurized fluid in conjunction with a fluid flow regulator that controls either the flow of fluid into, or the pressure of fluid in, the channel. The fluid pressure is allowed to increase until the control loop indicates that clearance between the rotor and stator that had been reduced by the load force has been restored and the rotor has been stabilized in a low-friction position. The signal generated in the control loop may itself be a fluidics signal or any other signal that is capable of serving as an indication of pressure or a pressure change or differential. Examples of signals other than fluidics signals are electrical signals and pneumatic signals.

A preferred type of regulator for certain embodiments of this invention is a bistable fluidic amplifier, particularly one that utilizes the same fluid for both the signal and the bearing and directs the pressurized fluid to either of two channels leading to opposing regions of the gap. Bistable amplifiers arranged in series can be used for systems that require multi-stage amplification of the signal to achieve a particularly high flow rate or pressure change in the gap. Numerous additional variations and refinements are within the scope of the invention, such as for example a pulsed fluidic transmission rather than a simple on-or-off transmission.

Among the various advantages offered by this invention are the ability to change the fluidic components by simple disassembly of the rotor and stator, without requiring additional machining of the pump housing or rotor. In embodiments in which the fluidics components are controlled electronically, closed-loop features can be used that are readily changed without changing the fluidics components or disassembling the rotor and stator. Systems in accordance with this invention can also be driven by a mechanical pilot stage with fluidic components that provide a high level of control and a control loop whose gain can be set electronically.

These and other features of the invention as well as its preferred embodiments are described in greater detail below.

DETAILED DESCRIPTION OF THE INVENTION AND PREFERRED EMBODIMENTS

The novel concepts of this invention are susceptible to a variety of ways of implementation and a wide range of constructions, encompassing rotary machinery in general, whether for manufacturing uses, consumer uses, or transportation such as aircraft motors and engines. An understanding of the invention as it applies to all such embodiments is best attained by a detailed review of one form of implementation. The following description and the attached drawings are addressed to one such implementation.

Figure 1:
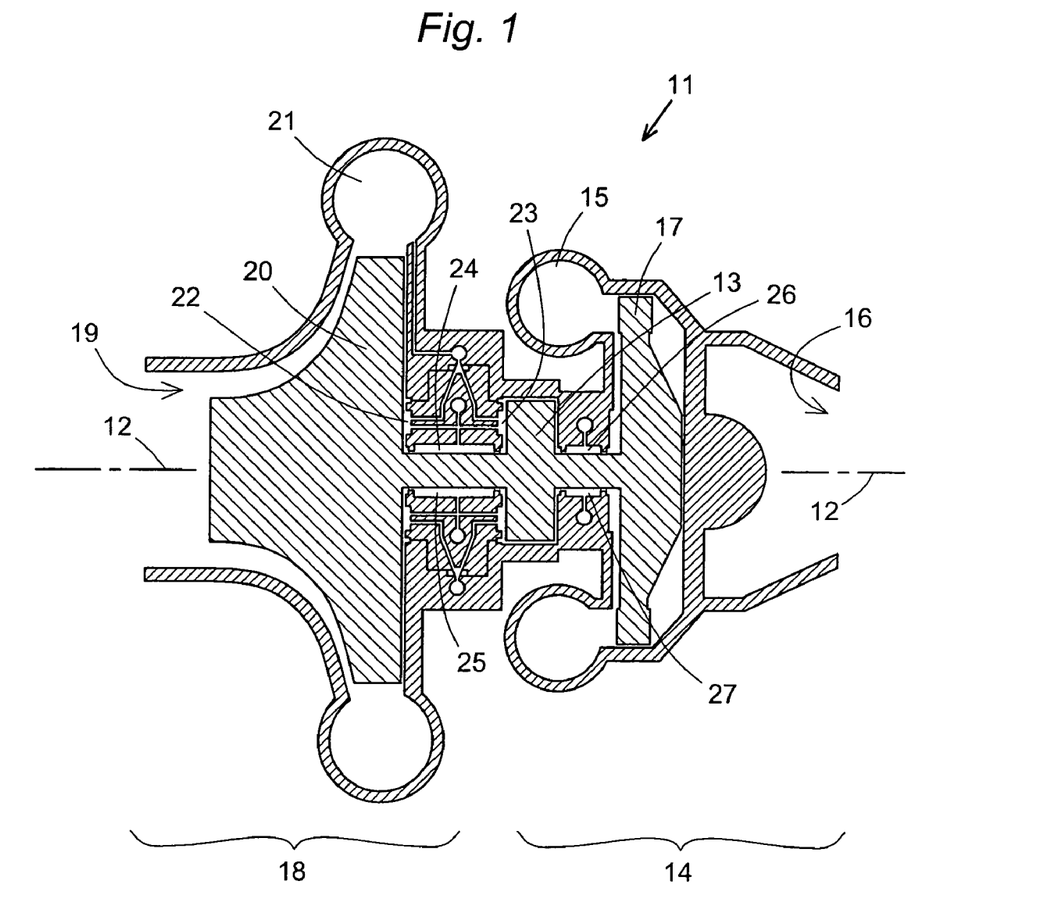
FIG. 1 is a cross section of a turbopump incorporating features of the present invention.

FIG. 1 is a cross section of a turbopump 11 that contains features embodying the present invention. This turbopump, which is designed for use in a rocket engine, is a body of revolution about an axis 12, which is also the axis of rotation of the turbopump rotor 13. The turbine 14 driving the pump includes a toroidal turbine inlet 15, an outlet 16 for the turbine exhaust, and turbine blades 17, of which one is shown. The remainder of the pump 18 includes an inlet 19 for low-pressure propellant, the pump blades 20, of which one is shown, and a toroidal pump outlet 21 for high-pressure propellant.

Operation of the turbopump results in a thrust load on the rotor 13 in the axial direction along the axis 12 and a radial load in the radial directions perpendicular to the axis 12. To accommodate the forces resulting from these loads, various hydrostatic load bearing pockets are formed in the gap between the rotor 13 and the stator, which consists of the remaining portions of the pump adjacent to the rotor. Thrust bearing pockets 22, 23 reside on opposing sides of one section of the stator, separated along the axial direction. The thrust load exerts a force along this axial direction which tends to displace the rotor in the direction of the force. This can be balanced by supplying pressurized fluid to the bearing pocket on the downstream side of the rotor until the pressure differential between the pockets is great enough to balance the thrust force. Likewise, radial bearing pockets 24, 25 reside on opposite sides of the rotor axis 12, separated along the radial direction. Radial forces are balanced by supplying pressurized fluid to the pocket on the downstream side of the force direction to produce a pressure differential between the radial bearing pockets that is sufficient to balance the radial force. A second pair of radial pockets 26, 27 also reside on opposite sides of the rotor axis 12 but at a distance from the first pair. The two pairs work together to balance radial forces arising along the entire length of the rotor shaft.

While FIG. 1 depicts only one pair of bearing pockets in each of these three sets, it should be noted that the Figure is only a cross section and these pairs are merely representative of the types and locations of bearing pockets. Further pairs of bearing pockets will often be present at the same location to provide full load balancing and flexibility. It is contemplated for example that two or more pairs of bearings will be distributed around the circumference of the rotor shaft at any one axial location along the shaft to balance all of the possible radial loads at that location.

Figure 2:
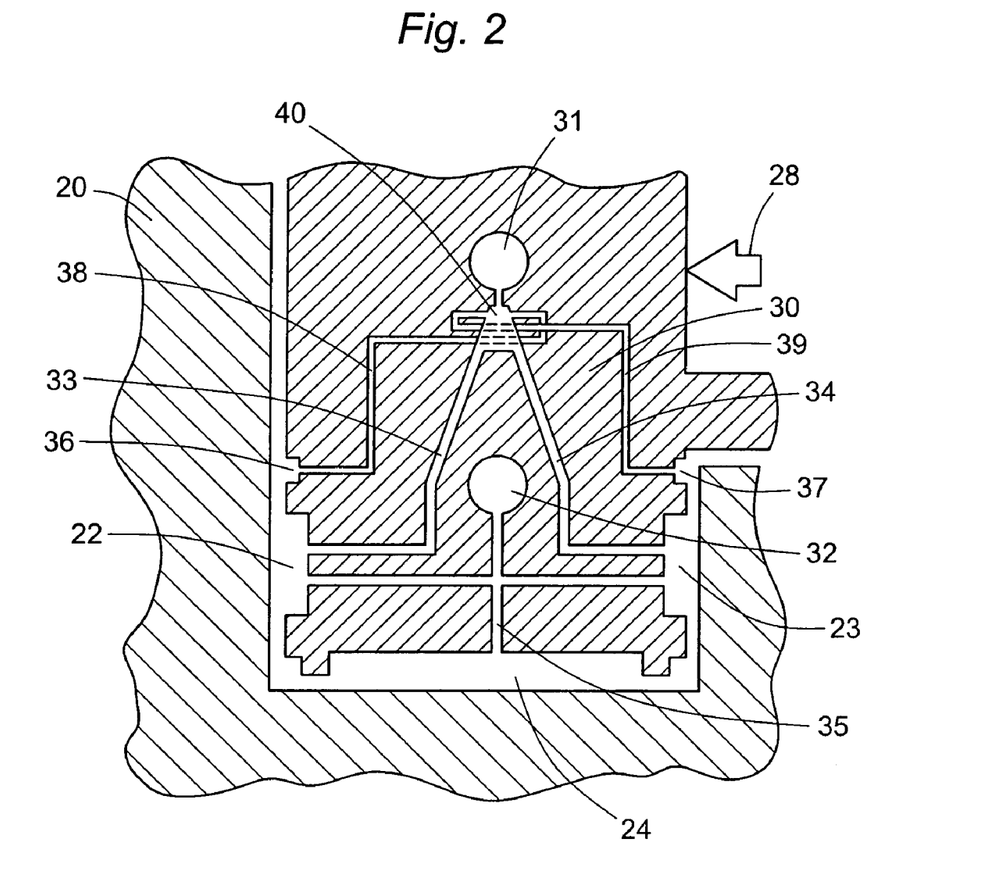
FIG. 2 is an enlarged view of a portion of the cross section of FIG. 1.

FIG. 2 offers an enlarged view of a portion of the cross section of FIG. 1 showing the thrust bearing pockets 22, 23 and one radial bearing pocket 24 of the first set as well as some of the fluidics channels that supply pressure or flow to the pockets. Within the body of the stator 30 are shown two reservoirs 31, 32 for pressurized fluid, one reservoir 31 supplying fluid to the two thrust bearing pockets 22, 23 through individual channels 33, 34, respectively, and the second 32 supplying fluid to the radial bearing pocket 24 through a separate channel 35. A thrust load forces the rotor in the axial direction 28, reducing the clearance on the downstream side of the rotor and compressing the fluid in the bearing pocket 22 on that side. The clearance is likewise reduced and the fluid compressed in a sensing pocket 36 on the same side of the rotor adjacent to the bearing pocket, and the various channels to and from the bistable amplifier 40 are arranged such that the pressurized fluid from the sensing pocket 36 causes the amplifier to send pressurized fluid to the bearing pocket 22. This continues until the clearance in the bearing pocket 22 increases enough to relieve the pressure in both the bearing and sensing pockets, thereby returning the rotor to its stable central position. An axial load in the opposite direction compresses the fluid in the opposite bearing and sensing pockets 23, 37, producing the same but oppositely directed effect in the bistable amplifier.

Figure 3A:
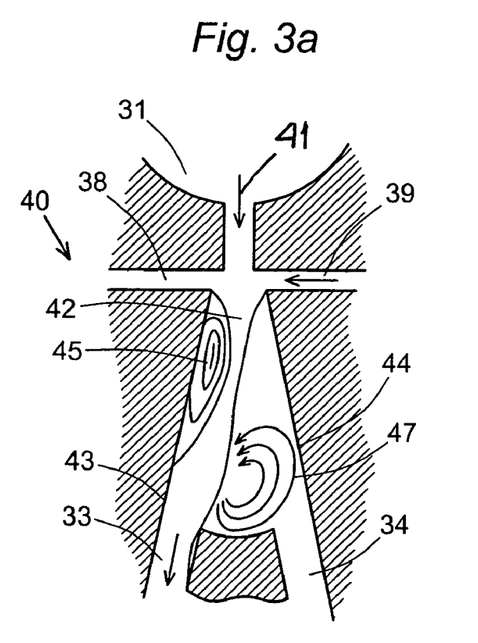
FIGS. 3a and 3b are two views of a cross section of a bistable amplifier incorporated into the turbopump of FIGS. 1 and 2.
Figure 3B:
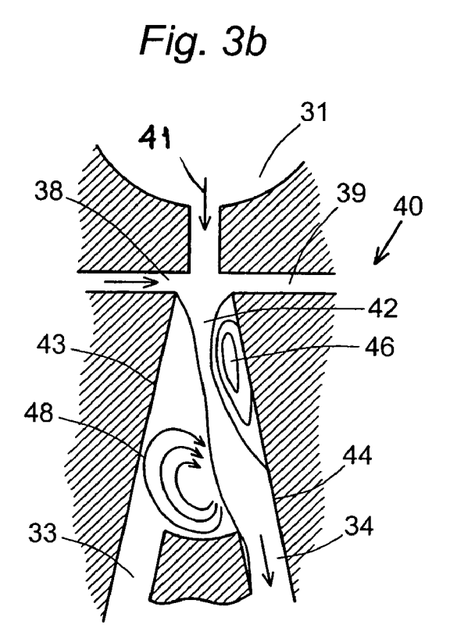

Two views of the bistable amplifier 40 showing its construction and operation are shown in FIGS. 3a and 3b, respectively. A fluid jet 41 emerging from the source of pressurized fluid 31 enters the amplifier cavity 42 and is directed to one or the other of two opposing sides 43, 44 of the cavity by a deflecting stream from one of the two pressure sensing channels 38, 39. As noted above, the channel that supplies the deflecting stream will be the one leading from the pressure sensing pocket on the side of the rotor where the pressure is highest, the high pressure having resulted from compression of the fluid due to the deflection of the rotor. The jet from the pressurized fluid source 31 thus combines with the deflecting stream and the combined stream leaves the amplifier cavity by the bearing supply channel (33 or 34) on the side toward which the jet is deflected. The deflecting flow in FIG. 3a is from one of the pressure sensing channels while the deflecting flow in FIG. 3b is from the other. The fluid flow configurations in each case are indicated by the Coanda bubbles 45, 46 and the vortices 47, 48 that are typically formed in bistable fluidic amplifiers of this type.

The radial bearing pockets 24, 25 of FIGS. 1 and 2 are supplied by their respective pressurized fluid source 32 in this embodiment in likewise manner using a separate bistable amplifier. The bistable amplifier for these radial pockets, although not shown in the Figures, is identical in operation to the bistable amplifier depicted in FIGS. 3a and 3b, with an analogous configuration joining appropriately positioned sensing pockets with the radial bearing pockets (i.e., on either side of the rotor along a radial direction) through appropriately configured channels leading to and from the amplifier. The amplifier orientation will be perpendicular to that of the thrust bearing bistable amplifier 40, extending across the plane of the cross section of FIG. 2 rather than within the plane.

The bistable amplifier described above is a single-stage amplifier, i.e., one which amplifies the pressure signal received from the pressure sensing pockets and whose output leads directly to the bearing pockets. For greater amplification, two or more bistable amplifiers can be arranged in series to provide multiple amplification stages, in which the two output streams from a first-stage amplifier serve as deflecting streams for a second-stage amplifier, each successive amplifier producing higher-volume flow in their output jets, the outlets from the final amplifier in the series leading to the bearing pockets.

Figure 4:
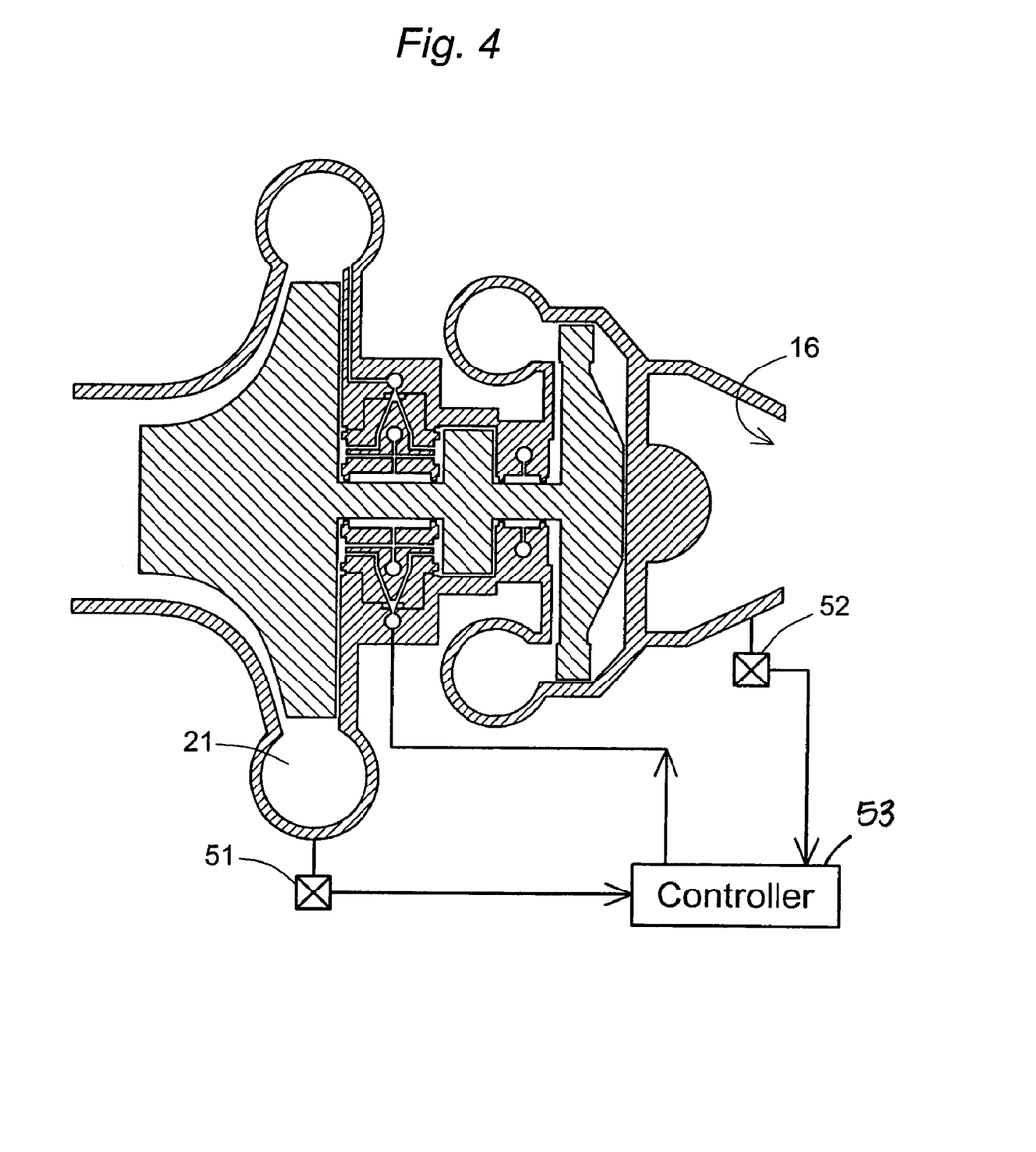
FIG. 4 is a cross section of a further turbopump incorporating features of the present invention.

In the structures shown in FIGS. 1 and 2, both the bearing supply circuits and the sensing circuits are fluidics components, i.e., the sensing signal is a fluidics signal transmitting pressure directly to the fluid regulator. In alternative embodiments of the invention, sensing signals can be transmitted by methods other than fluidics, such as for example by mechanical means of transmission or electronic means. FIG. 4 is an illustration of a turbopump identical to that of FIG. 1 except that the fluidics pressure sensing signals of FIG. 1 that are arranged to transmit the thrust load are replaced by electronic signals, and the thrust sensing pockets are replaced by pressure transducers 51, 52, one positioned in the pump outlet 21 and the other in the turbine exhaust 16.

The electronic signals from these transducers are fed to a controller 53 which controls the deflecting jets to a bistable amplifier. The bistable amplifier is identical in configuration to that FIGS. 2, 3*a*, and 3*b* except that the deflecting jets, instead of being fed directly by the sensing pockets, are fed by a separate source of pressurized fluid and controlled by a pilot valve.

Figure 5:
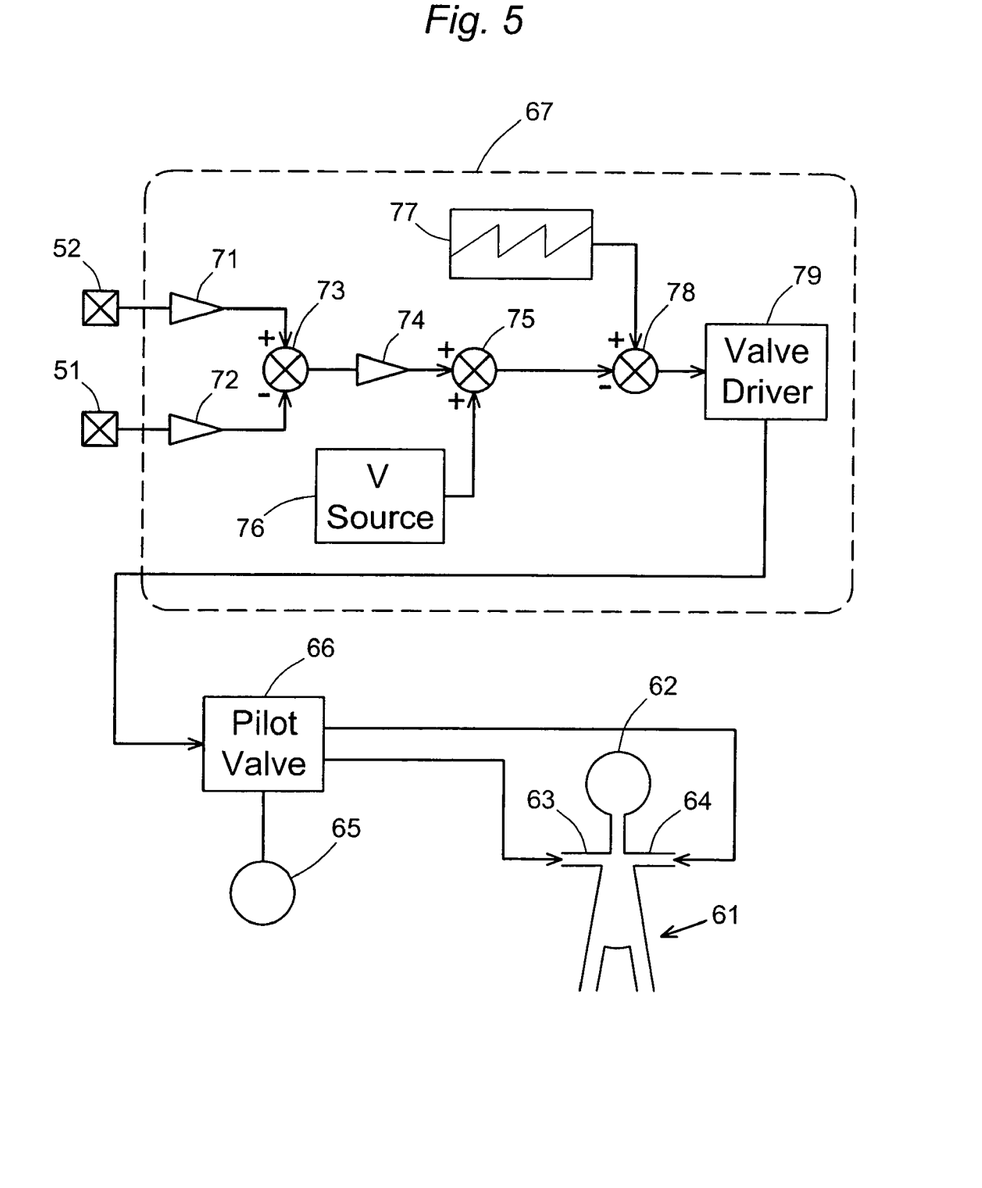
FIG. 5 is a circuit and fluidics diagram for the sensing and balancing control loop of the turbopump of FIG. 4.

An example of an electric control loop for the electronic signal-driven system of FIG. 4 is shown in FIG. 5. In this Figure, a bistable amplifier 61, a pressurized fluid source 62 for the bearings, and two deflecting jets 63, 64 are shown, together with the two pressure transducers 51, 52. A separate pressurized fluid source 65 is also shown, together with an electronically controlled pilot valve 66 that directs fluid from the pressurized source 65 to either of the two deflecting jets 63, 64. Electronic control of the pilot valve 66 is provided by an electric pulse with modulation circuit 67. The modulation circuit includes operational amplifiers 71, 72 on the electronic signals from the pressure transducers, a comparator 73 and a further operational amplifier 74, an offset component 75 supplied by a voltage source 76, a sawtooth wave source 77 and a further comparator 78, and finally a valve driver 79 supplying a driving signal to the pilot valve 66.

A control loop such as that depicted in FIG. 5 can be used to send an on-or-off signal to the pilot valve 66 in direct response to the electrical sensing signal. Alternatively, such a loop can produce a pulsing signal to the pilot valve 66 whose amplitude or frequency can be varied in response to the sensing signal. A square-wave pulse form can be varied, for example, by increasing or reducing the pulse width in the positive direction at the expense of the negative, or vice versa. Other variations and means of biasing the pressure transmitted to one bearing pocket relative to an opposing pocket will be readily apparent to those skilled in electronics.

The channels shown in FIGS. 1 through 4 can be formed in the stator by any conventional method. Examples of such methods are casting, drilling, and etching. A preferred method is the use of platelet technology, in which the channels and the surrounding body are formed from laminated thin sheets of metal that are termed platelets. Slits or openings are formed in the individual sheets by etching, and the sheets are then stacked with the slits or openings aligned to form internal channels and cavities of the desired configuration. The stacked sheets are then bonded to form a laminate. Platelet technology is well known in the art, and representative descriptions can be found in U.S. Pat. No. 3,555,666 (Rhee, issued Jan. 19, 1971), U.S. Pat. No. 5,387,398 (Mueggenburg et al., issued Feb. 7, 1995), and U.S. Pat. No. 5,804,066 (Mueggenburg et al., issued Sep. 8, 1998), the contents of each of which are incorporated herein by reference in their entirety. As described in these patents, etching is achieved either by photolithography (chemically etching of individual platelets through masks) or by electrodischarge machining, two methods that are well known among those skilled in the art. Bonding of the platelets is achieved either by diffusion bonding, roll bonding, brazing, or other conventional techniques for laminating metals. Diffusion bonding is a preferred method for rocket chambers and nozzles and is achieved by hot-pressing the platelets at pressures typically in the range of 6.9 to 20.7 MPa (1000 to 3000 psi) and temperatures typically in the range of 450° C. to 550° C. The platelet material can be any material that is suitable as a material of construction for the machinery and that is capable of being formed into thin sheets, etched and laminated. Examples of materials that meet this description are copper, steel, aluminum and other metals commonly used in the construction of rotary machinery. The thickness of each platelet can vary and the exact thickness is not critical to the operation of the engine or to the novelty of this invention. In most cases, platelets having thicknesses less than about 0.025 inch (0.064 cm), or within the range of about 0.001 inch (0.00254 cm) to about 0.025 inch (0.064 cm), will provide the best results in terms of ease of manufacture and the formation of channels of the appropriate dimensions. The total number of platelets in the laminate can vary and will be selected on the basis of the dimensions of the rotor and stator and the desired dimensions of the flow channels, as well as the ability to withstand the conditions expected to be encountered during use. In most cases, the number of platelets will range from 10 to 2,500, and preferably from 20 to 500.

A platelet can be etched either through its entire thickness to produce a hole or an elongated slot, or through only part of the thickness to leave a depression or trough. The formed is known in the art as "through-etching" while the latter is known as "depth etching." A series of through-etched platelets can be laminated with the holes or slots aligned to form a channel with a dimension transverse to the platelet surfaces that is equal to multiples of the platelet thickness. A depth-etched platelet can be laminated to an unetched platelet to achieve a passageway that has a dimension that is less than one platelet thickness. Two depth-etched platelets can be laminated with the etched regions facing each other to achieve a passageway whose width is the combined depth of the two etched regions. Many combinations and junctions joining passageways can be made by either of these methods.

Figure 6A:
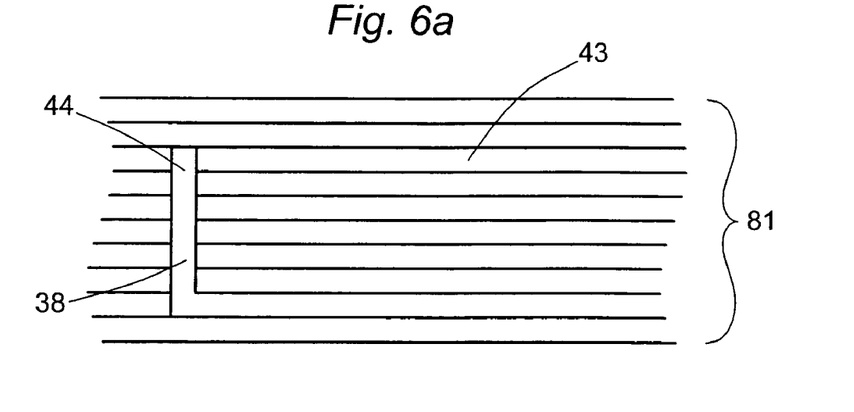
FIGS. 6a, 6b and 6c are three cross sections at different depths of a platelet laminate showing how the bistable amplifier of FIGS. 3a and 3b and the various sensing channels leading to the amplifier can be formed by platelet technology.
Figure 6B:
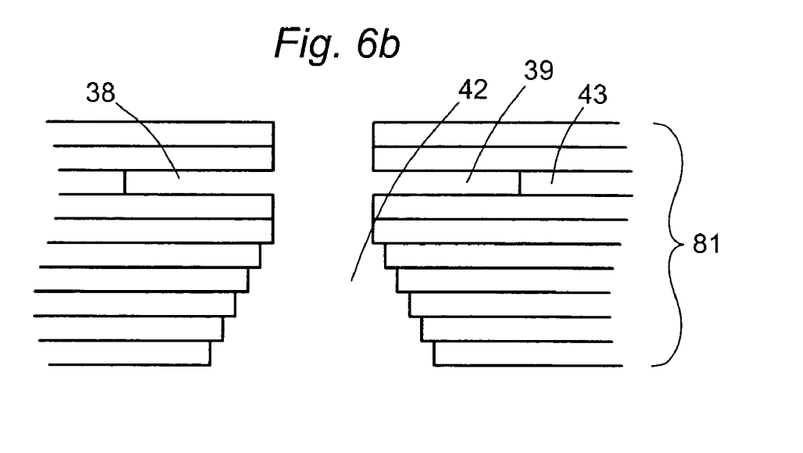
Figure 6C:
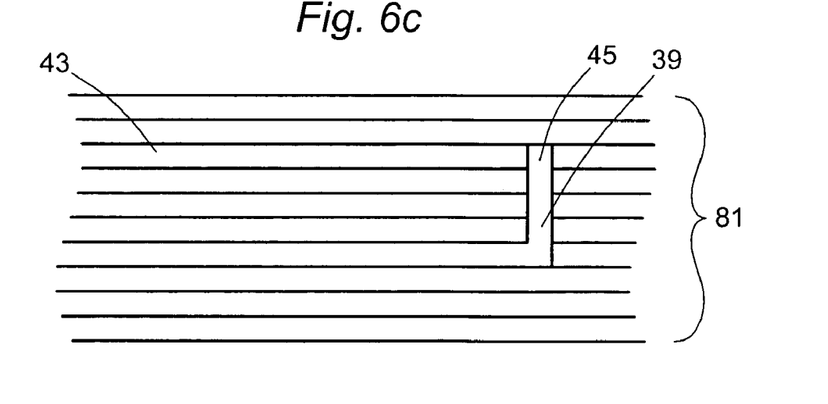

An illustration of how the various channels and their connections to the bistable amplifier can be formed by platelets is shown in FIGS. 6*a*, 6*b*, and 6*c*. These Figures represent three cross sections of a platelet stack 81, each cross section transverse to the planes of the platelets. The cross sections are parallel to each other, representing three different depths. The cavity 42 of the bistable amplifier is formed by superimposed slots of varying width in the central cross section (FIG. 6*b*), and the pressure sensing channels 38, 39 are formed by superimposed and overlapping slots that are visible in all three cross sections. At their juncture with the amplifier cavity 42, the pressure sensing channels 38, 39 are formed from openings in the same platelet 43 (FIG. 6*b*), while the other segments of these channels are formed by aligned openings at different depths, one such channel (FIG. 6*a*) lying forward of the cavity and the other (FIG. 6*c*) lying to the rear of the cavity, with connecting segments 44 (FIG. 6*a*) and 45 (FIG. 6*c*) extending through the different depth planes of the Figures. The two channels 38, 39 thereby form non-intersecting passageways to the amplifier cavity.

The control afforded by the balancing mechanism and control loop described above can be used to adjust the hydraulic stiffness and damping characteristics of any fluid bearing, hydrodynamic or hydrostatic, in rotary machinery in general. The principles embodied in this turbopump can thus be applied to any machinery containing a rotor and stator, with particular benefits to units that are designed for use at high speed and high pressure.

The foregoing description focuses on particular embodiments of the invention for purposes of explanation and illustration. Further embodiments and modifications of the above will be apparent to those skilled in the art upon reviewing this description, such embodiments and modifications falling within the scope of the invention as defined by the appended claims.

What is claimed is:

1. Apparatus producing a self-regulating fluid bearing between a rotor and stator wherein said stator is a laminate of platelets, said apparatus comprising:
   first signal generating means for generating a signal representative of a pressure change within a first gap between opposing surfaces of said rotor and said stator, said pressure change being one that is indicative of a displacement of said rotor caused by a load imposed on said rotor;
   second signal generating means for generating a signal representative of a pressure change within a second gap between opposing surfaces of said rotor and said stator, said pressure change being one that is indicative of a displacement of said rotor caused by a load imposed on said rotor;
   a source of pressurized fluid;
   a first channel configured to convey fluid from said source of pressurized fluid to said first gap and a second channel configured to convey fluid from said source of pressurized fluid to said second gap, said first and second channels residing in said stator and defined by superimposed openings in adjacent platelets; and
   fluid flow regulating means for regulating fluid flow through said first and second channels in response to said signals to reduce said displacements.

2. The apparatus of claim 1 wherein said rotor has an axis of rotation and said first and second gaps are separated along said axis of rotation, said pressure changes resulting from an axial force on said rotor.

3. The apparatus of claim 1 wherein said rotor has an axis of rotation and said first and second gaps are separated along a line transverse to said axis of rotation, said pressure changes resulting from a radial force on said rotor.

4. The apparatus of claim 1 wherein said first and second signals are electrical signals and said first and second signal generating means are pressure transducers each converting pressure to an electrical signal representative of said pressure.

5. The apparatus of claim 1 wherein said first and second signals are fluid pressure levels detected within said first and second gaps respectively.

6. Apparatus producing a self-regulating fluid bearing between a rotor and stator, said apparatus comprising:
   first and second signal fluid flow signals representative of fluid pressures within first and second gaps, respectively, on opposing surfaces of said rotor and stator and on opposite sides of said rotor, such that changes in said pressures are indicative of a displacement of said rotor caused by a load imposed on said rotor;
   a source of pressurized fluid;
   first and second channels configured to convey fluid from said source of pressurized fluid to said first and second gaps, respectively; and
   a bistable fluidic amplifier with individual inlets for said first and second fluid flows such that a net inflow from said first fluid flow diverts pressurized fluid from said source of pressurized fluid to said first channel and a net inflow from said second fluid flow diverts said pressurized fluid to said second channel.

7. Apparatus producing a self-regulating fluid bearing between a rotor and stator, said apparatus comprising:
   means for generating fluid flows directly from first and second gaps, respectively, between opposing surfaces of said rotor and stator and on opposite sides of said rotor, said fluid flows being indicative of a displacement of said rotor caused by a load imposed on said rotor;
   a source of pressurized fluid;
   first and second channels configured to convey fluid from said source of pressurized fluid to said first and second gaps, respectively; and
   a bistable fluidic amplifier with individual inlets for said first and second fluid flows such that a net inflow from said first gap diverts pressurized fluid from said source of pressurized fluid to said first channel and a net inflow from said second gap diverts said pressurized fluid to said second channel.

8. The apparatus of claim 7 wherein said rotor has an axis of rotation and said first and second gaps are separated along said axis of rotation, said pressure changes resulting from an axial forces on said rotor.

9. The apparatus of claim 7 wherein said rotor has an axis of rotation and said first and second gaps are separated along a line transverse to said axis of rotation, said pressure changes resulting from radial forces on said rotor.

10. The apparatus of claim 7 wherein said stator is a laminate of platelets, said first and second channels reside in said stator and are defined by superimposed openings in adjacent platelets.

* * * * *